Nov. 5, 1940.  W. TAMMINGA  2,220,466
LIQUID DISPENSING RECEPTACLE
Filed March 11, 1939  2 Sheets-Sheet 1

INVENTOR.
William Tamminga
BY
ATTORNEY.

Nov. 5, 1940.   W. TAMMINGA   2,220,466
LIQUID DISPENSING RECEPTACLE
Filed March 11, 1939   2 Sheets-Sheet 2

INVENTOR.
William Tamminga
BY
Cornelius Zabriskie
ATTORNEY.

Patented Nov. 5, 1940

2,220,466

UNITED STATES PATENT OFFICE 2,220,466

LIQUID DISPENSING RECEPTACLE

William Tamminga, Bronx, N. Y., assignor to Monitor Process Corporation, Jersey City, N. J., a corporation of New Jersey Application March 11, 1939, Serial No. 261,190

14 Claims. (Cl. 221—114)

This invention relates to liquid dispensers and is directed, more particularly, to the dispensing of milk from standard size milk shipping cans. The primary purpose of the invention is to provide a satisfactory can in which milk may be supplied by creameries to retailers, to be dispensed by them in relatively small, measured quantities.

To be suitable for this purpose, a receptacle must fulfill certain definite practical requirements: It must be so constituted that, when the can is set up in a position from which the milk is to be dispensed, said can will provide means whereby the milk may exit through the wall of the can and this means must include measuring devices to dispense definite quantities of milk at each operation. It must be so constituted that all parts of the receptacle and measuring devices, which come in contact with the milk, may be thoroughly cleansed and sterilized at the creamery, so that the retailer is not required to sterilize any part thereof for, as a practical matter, retailers are apt to become careless and fail to properly safeguard apparatus by which milk is dispensed. It must embody a structure which is sufficiently rugged and durable to stand the hard usage to which milk cans are commonly subjected. It must be relatively economical to manufacture and readily operable by unskilled persons. It must be so constituted that it will not leak and will not inadvertently discharge milk at any time and particularly before it is in proper cooperation with the dispensing apparatus in the retailer's establishment.

Of the foregoing requisites, the sanitary requirements are most important, for in practically every large city, the requirements of the Board of Health are particularly rigid with respect to the handling of milk and the health of the public is safeguarded by numerous stringent regulations requiring the most thorough cleansing and sterilizing of all parts with which the milk comes into contact. To fulfill these requirements creameries are provided with cleaning and sterilizing equipment and all cans are thoroughly treated before milk is introduced therein. If any device, such as a dispensing device, is associated with and forms a part of the can, it must be so constructed that it can be effectually cleaned, and sterilized at the creamery without undue added labor, prior to the placing of the milk in the cans, and unless it is so constructed, it will not be acceptable to the dairies and will not be approved by the Board of Health. The present invention meets all these requirements.

Speaking generally, this invention, in its preferred form, comprises a pair of coaxial tubes mounted for axial sliding relation with respect to one another and collectively through the wall of the can, preferably, although not necessarily, the bottom wall, and with which wall is associated appropriate packing to insure a liquid tight joint while permitting of such sliding movement. The two tubes are of considerably different diameters to provide between them a chamber adapted to act as a measuring receptacle into which milk can be admitted from the interior of the can and discharged to the exterior thereof. The flow of such milk is controlled by relative axial movement between the tubes, one of which carries tandem valvular means, cooperating with like valvular means on the other. One valvular means serves to admit milk into the measuring receptacle and the other controls the discharge of the milk therefrom. These valvular means are so coupled that one is closed, while the other is opened, so that the dispensing of measured quantities is assured. The smaller tube provides for the introduction of air into the receptacle, in order that said air in rising through the milk will serve to agitate the same and insure a uniform distribution of the cream throughout the milk.

The admission of this air is controlled by an appropriate valve in the smaller tube. This valve is in the nature of a check valve which will permit the entrance of air into the can, but preclude the exit of milk therefrom, as will be hereinafter more fully described. Furthermore, the check valve is preferably so constituted that it is adapted to be used only during the dispensing of a single can of milk, after which it is discarded to be replaced by a new and sterile valve.

In one of its modified forms, the invention provides for the dispensing of milk as in the preferred form, but with mechanical agitation. This mechanical agitation is effected by supporting on the tandem valves one or more disks or baffles adapted to be positioned within the container, so that, when the valves are operated, the baffles are bodily moved therewith for the purpose of agitating the milk. This latter construction requires no feed of air as in the preferred arrangement.

The invention also includes means for protecting the dispensing means from dust or other extraneous matter during shipment, as well as means for locking the parts against dispensing movement, as will be hereinafter more fully explained.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1:
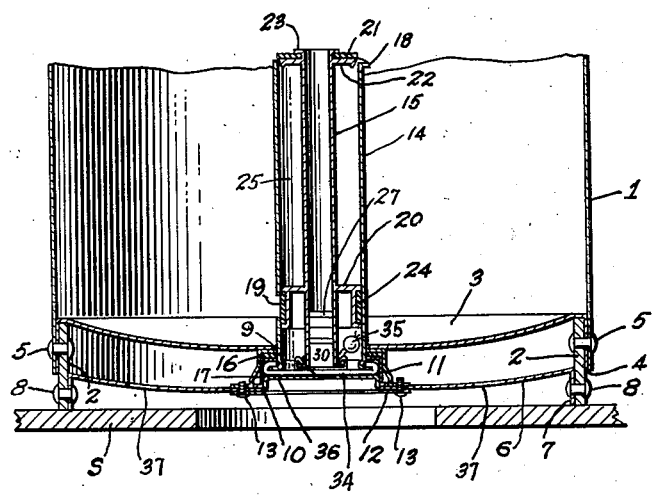
Figure 1 is a central vertical section through a can embodying the present invention with the dispensing devices in retracted position within the can.

Referring to the drawings, 1 indicates a receptacle adapted to contain a liquid. This receptacle may be of any kind or shape, but, in the preferred form of the present invention is a standard can of the shape commonly employed by dairies. This can is circular and has a telescoping removable cover through which milk is introduced into the can. Ordinarily these cans have a single bottom slightly concave in shape and welded or riveted to the lower portion of the side wall, which is reinforced by a ring of heavy metal.

According to the present invention in its preferred practical form, I incorporate a heavy ring 2, somewhat deeper than heretofore, and with this ring associate a double walled bottom. The inner wall or bottom 3 is provided with a peripheral depending flange 4 which abuts the inner face of the side wall and within this flange is positioned the relatively deep reinforcing ring 2. Rivets 5 are passed through the wall of the can, the flange of the bottom and the ring 2 to hold these parts together with a liquid tight joint. The lower bottom or outer wall 6 is spaced from the inner wall 3, has a depending flange 7 which abuts the inner face of the ring and is riveted thereto by rivets 8. This gives a very strong and rigid construction which materially reinforces the can and is well able to withstand hard usage.

The inner and outer walls 3 and 6 have coaxial openings 9 and 10, the latter of which is somewhat larger than the former. Interiorly of the opening 10 is a sheet metal packing cup 11 which extends in the direction of the inner wall 3 and abuts said inner wall. It has a central opening coaxial with and of substantially the same size as the opening 9 in the inner wall. A reinforcing annulus 12 bears against the outer face of the outer wall 6 and rivets 13 pass through this reinforcing ring and through a peripheral flange on the cup 11 to bind the parts together.

Through the openings thus provided in the bottom of the can are adapted to slide two tubes 14 and 15 which are coaxial with one another. The larger tube 14 is of a size to pass closely through the openings in the cup 11 and the inner wall 3 and the joint between these parts is adapted to be sealed by a packing gasket 16 seated within the cup 11 and kept under compression by a pressure member 17. This pressure member may be held in place to press the gasket tightly against the tube 14 in any appropriate way. However, in practice the peripheral flange of the pressure member as well as the inner periphery of the openings through the outer wall 6 and the ring 12 are provided with cut-outs with intervening projections, so that the pressure member may be introduced into the cup when the cut-outs are in register and then rotated to lock it in place, as fully disclosed in my copending application, Serial No. 241,899, issued as Patent No. 2,186,083.

Figure 2:
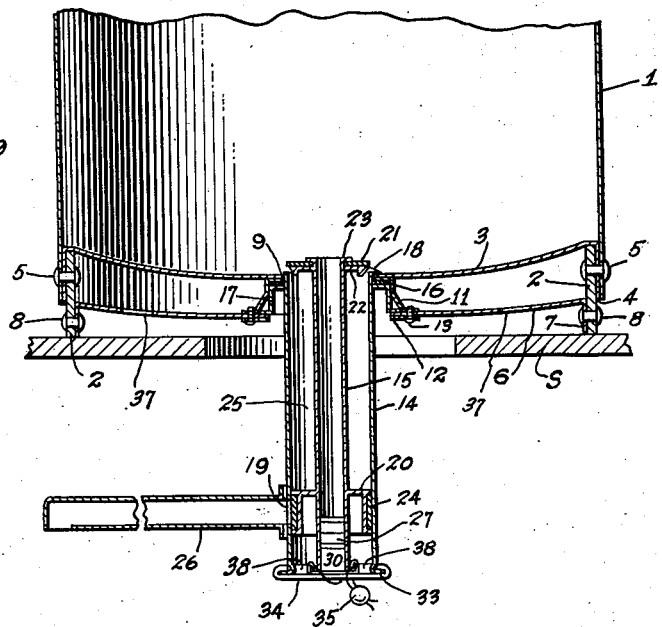
Figure 2 is a like view showing the parts in dispensing position.

The mounting described permits of sliding axial movement of the tube 14 through the bottom of the can from the retracted position of Figure 1 to the extended position of Figure 2, while the gasket 16 maintains a tight leak-proof joint between these parts at all times. Furthermore the recess formed within the pressure member allows the lower end of the tube to be received therein when the tube is retracted. The tube is precluded from being wholly withdrawn so long as the gasket is in place by a lip or projection 18 formed on the inner end of the tube.

Both ends of the larger tube 14 are open and said tube is provided intermediate its ends and nearer its outer end, with a discharge port 19 adapted to be normally sealed by a slide valve 20 rigidly supported on the smaller tube 15. The inner end of the smaller tube carries a disk valve 21 preferably, although not necessarily, of rubber or some other yielding material and this disk valve is supported between a flange 22 rigid with the tube and the inner end of the tube which is flared over as shown at 23. The valve 21 is of the plunger or disk type and is of a size to slide closely within the larger tube 14 and to form therewith a tight liquid seal. This disk valve constitutes the inlet valve of the structure, while the valve 20 constitutes the outlet valve. The latter valve also slides within the larger tube and is provided with a resilient ring 24 of rubber or the like to insure a tight seal.

The valves, arranged in tandem as stated, are so located with respect to one another that, when the smaller or inner tube is in the position shown in the drawings, the inlet valve will be opened to allow milk to flow into the space or chamber 25 between said tubes, but the outlet valve 20 will seal the port 19, so as to preclude the flow of liquid through said port. The tubes are of such size that the chamber 25 between them has the desired capacity for a measured quantity of milk. Thus the milk will flow into said chamber and lodge therein in desired volume when the parts are in the position shown. When the tubes are simultaneously and bodily moved from the position of Figure 1 to the position of Figure 2 and the inner tube thereafter axially moved in a downward direction while the outer tube remains stationary, the parts will come into the position wherein the discharge port 19 will be outside of the can. If the inner tube is now moved downwardly, the discharge valve 20 will uncover the discharge port 19, while the inlet valve 21 will enter into and seal the inner end of the larger tube. Thus the milk in the measuring chamber may be dispensed through the discharge outlet while the entrance of further milk into the measuring chamber will be precluded. In this way it is possible to dispense measured quantities in a simple and efficient manner.

In practice a suitable nozzle 26 is adapted to be associated with the outer tube when it is in its extended position as shown in Figure 2. This nozzle may be clamped in place in any suitable way and may conveniently be made of paper or cardboard pressed into the desired shape, so that after it has been used for dispensing the contents of one can, it may be discarded. Any appropriate clamp may be employed to bind the nozzle in juxtaposition with the discharge outlet 19.

Milk tends to stratify, with the cream at the top and some means must be provided, if the can is to remain at rest, for agitating the milk to insure an equitable distribution of the cream. In accordance with the present invention this is accomplished by continuously or periodically introducing air through the smaller or inner tube 15, so that the air will bubble up through the milk and permit the necessary agitation. It therefore becomes necessary to provide means to permit the entrance of air as stated and at the same time preclude the exit of milk through the smaller tube. This means may conveniently take the form of the valve shown in detail in Figures 3 and 4.

This valve is of the character shown in my said copending application. It embodies a hollow rubber piston 27 having at one end a boss 28 slotted at 29 to provide a check valve. The rubber piston is mounted on a metal thimble 30 having at its outer end an annular flange 31. This flange is adapted to bear against a peripheral flange at the outer end of the inner tube 15 and is provided with bendable wings 32 adapted to be bent over the flange of the inner tube to lock the piston in place in such position that air may pass through the check valve 29 into the can, while liquid is precluded from passing therethrough in a counterdirection.

When the parts are in the position shown in Figure 1 with both tubes in retracted positions, it is desirable to lock these tubes in place, so that they cannot inadvertently move with respect to one another and allow the discharge of milk. This may be readily accomplished by providing the outer end of the larger tube 14 with a peripheral flange 33 and applying a locking bar 34 thereto in the manner best shown in Figure 2. This bar, slipped over the flange 33 by lateral movement will grip the flange and bear against the outer end of the inner tube, so as to maintain the inner tube against such outward movement as would permit of the unsealing of the discharge port. A safety seal shown as a wire bent around the bar 34 and the tongues 32 and locked by a seal 35 may be employed to indicate that the milk therein has not been unsealed since it left the creamery. When the parts are in the position shown in Figure 1, the bar will occupy a position within the recess of the pressure member 17 and, when thus placed, the walls of the recess will maintain the bar against displacement. When withdrawn into the position of Figure 2, the bar may be removed laterally after the seal is broken to permit of operation of the dispenser.

A dust cap 36 having a tight pressed-in fit serves to close the opening in the outer wall 6 when the parts are in the retracted position of Figure 1.

When a can, constructed as described, is returned empty to the creamery, the pressure member 17 is first removed and then the outer tube 14, carrying with it the inner tube 15, is removed as a unit, the gasket 16 coming along with the outer tube. The inner tube 15 may be then bodily withdrawn through the inner end of the outer tube 14. This leaves the outer tube wholly unencumbered so that it may be thoroughly cleaned in any appropriate way.

Figure 3:
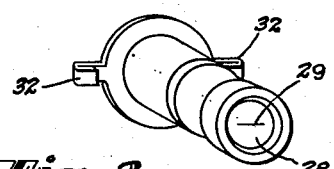
Figure 3 is a perspective view of the check valve removed from the smaller tube.
Figure 4:
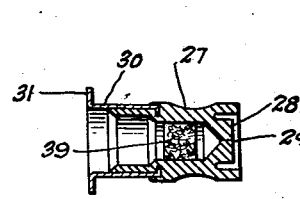
Figure 4 is a central section through the check valve.

The check valve unit shown in Figures 3 and 4 is next removed from the inner tube 15. The valve 21 may, if desired, be changed by simply springing it off over the end flange 23 and a new one substituted. Likewise the packing 24 of the discharge valve 20 may also be changed if desired, although ordinarily it is not necessary to change or remove these valves. The inner tube with valves attached may be then thoroughly cleaned. The gasket and pressure member are then thoroughly cleaned. The can is next cleaned, including the space between the inner and outer walls of the bottom, the outer bottom 6 being provided with holes 37 through which the space between the inner and outer bottoms may be cleaned and drained. A new check valve unit is next introduced into the inner tube and locked in place by bending over the tongues 32 as described. The parts are now reassembled by reversing the order of dismantling described and a new lock bar and seal are applied, after which the tubes are collectively pushed into the interior of the can and partake of the positions of Figure 1.

The can with tubes assembled therein is now sterilized as a unit, usually by the use of live steam, and the dust cap 36 is then applied. Milk is thereupon introduced into the can and the conventional cover is put on and sealed and the can of milk in a thoroughly sterile condition is ready for shipment.

Arriving at the retailers the can is set up in a suitable cabinet S in the location where the milk is to be dispensed. This support has an opening below the opening in the can. The dust cap having been removed, the retailer reaches in through the bottom opening and grasping the bar 34, pulls out both tubes. He next attaches the discharge nozzle 26 and then breaks the seal 35 and removes the lock bar 34 and connects the inner tube to appropriate operating mechanism whereby it may be reciprocated. This may be accomplished manually or by coin controlled mechanism, the function of which is to reciprocate the inner tube with respect to the outer tube while the latter is held stationary. When the inner tube is retracted milk runs into the measuring chamber and when it is extended the milk runs out through the discharge outlet in the quantity which has been measured by such chamber. It will be noted, however, that the outer tube 14 is provided adjacent its outer end with an internal bead 38 which serves as a stop for the discharge valve 20 and precludes it from moving out through the end of the outer tube. Also, the air entering through the check valve may be filtered by a filtering material 39 therein.

It will be noted that, during all of these operations the milk never touches any part which has not been sterilized at the creamery except the nozzle 26 which, as stated, may be made of paper for a single use. Furthermore, if the construction described is associated with the side of the can no nozzle is required as the milk may flow by gravity directly from the outlet into a tumbler or other receptacle.

It will thus be apparent that I have provided a device of remarkable simplicity yet with high efficiency for the sanitary packaging, distribution and dispensing of measured quantities of milk. The structure is such that it may be economically manufactured and it may be actuated by the uninitiated since the operation of the parts is simple. The employment of a single use throw away check valve is desirable though not essential to this invention. It is, however, preferred and the structure shown is so cheap as not to interfere with the practicability of this practice. The marked advantage of the structure shown moreover is that it does not change the appearance of the conventional can, it embodies no moving parts internally of the can during the dispensing of milk and it dispenses the entire contents of the can without leaving a residue therein which would otherwise become waste. This complete dispensing is accomplished moreover without the necessity of tilting the can which is so essential in many prior devices, particularly where milk is dispensed through the side or top of the can.

Figure 5:
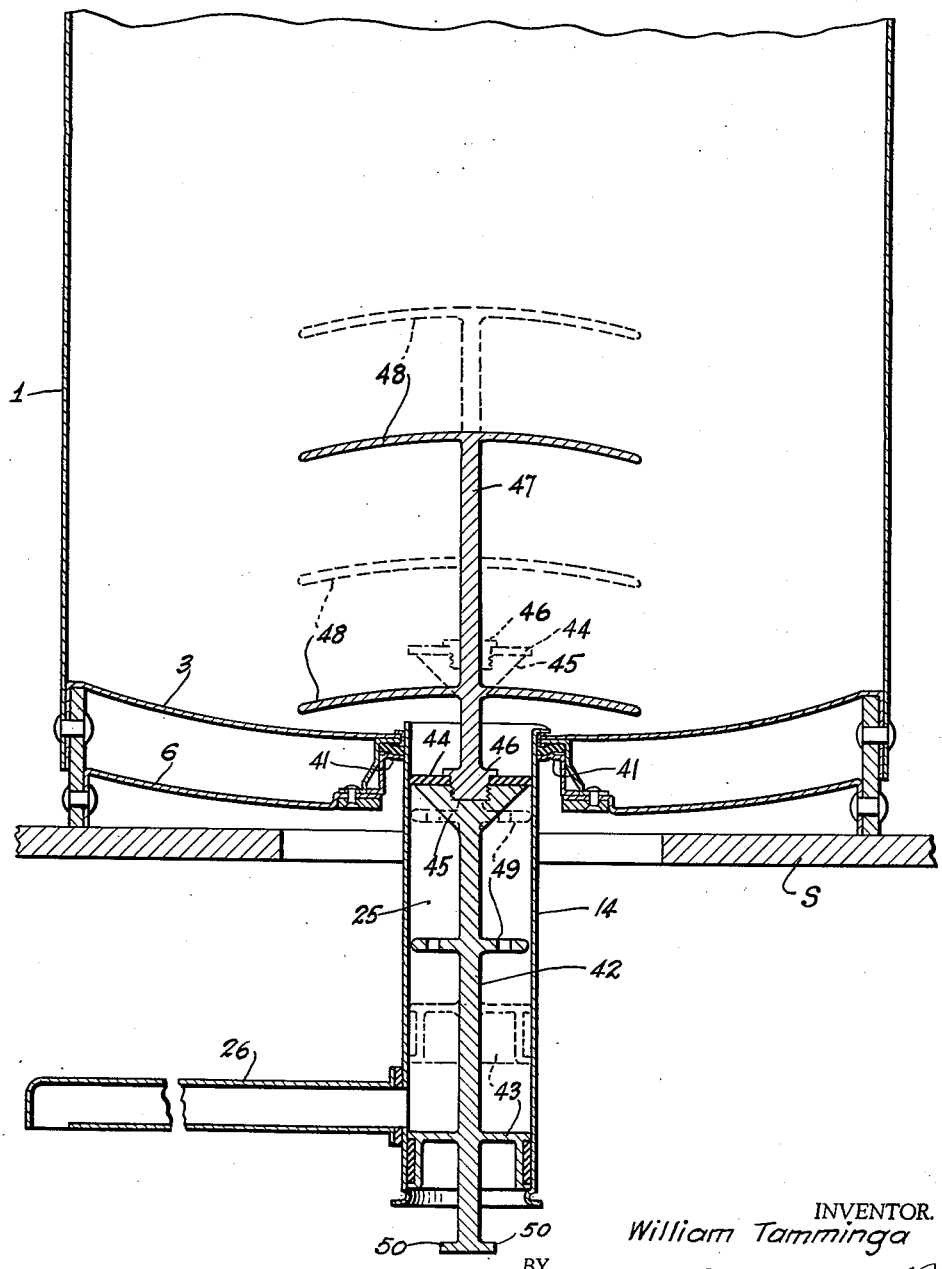
Figure 5 shows a modified form of the invention.

In the modified form of the invention shown in Figure 5, the can has a single side wall 1 as heretofore and inner and outer bottom walls 3 and 6 which are secured to the side wall as in the preceding figures. The arrangement at the center of these walls for supporting the dispensing means is the same as in the preceding figures, except that the margins of the central openings in the inner wall 3 and in the packing cup 11 are embraced within a grommet 40. The face abutting portions of the wall 3 and the flange of the cup are soldered together and the grommet is also soldered or sweated into place so as to produce a perfectly tight joint at this point. The pressure member 17 is preferably provided with an annular bead 41 which engages firmly with the gasket and causes it to make a tight fit with the walls of the chamber in which it is enclosed and at the same time bear firmly against the outer tube 14. In this construction the holes 37 shown in the outer bottom wall in Figure 1 may be omitted and the space between those walls tightly sealed. The grommet construction described can be used also in the construction of Figure 1.

In the construction of Figure 5 mechanical agitation of the milk is provided for, and such being the case, it is not necessary to have an inner tubular member. I may utilize in lieu of the tube 15 a solid valve stem 42. To this solid valve stem is affixed the discharge valve 43, while the inlet valve 44 may be secured against the flange 45 of the valve stem by a screw plug 46 on which is superimposed a rod 47 carrying one or more agitating disks 48. These disks are so positioned as to be located inside of the can, so that when the valve stem 42 is reciprocated from its full line dispensing position to its dotted line charging position, and vice versa, the agitator disks 48 will move with the valve stem for appreciable distances and thus thoroughly agitate the milk. The flange or spider 49 shown on the valve stem between the valves is for the purpose of guiding the valve stem in its operations when the inlet valve moves beyond the end of the tube 14.

The lower end of the valve stem has laterally projecting arms 50 by means of which it may be attached to suitable operating mechanism of any appropriate character and these projections can be secured by a wire and seal 35 to a locking bar 34 of the character hereinbefore described.

It will be apparent from the foregoing that the structure of Figure 5 is simpler than the construction of the preceding figures and does not require the employment of any air pressure for the agitation of the milk, as mere reciprocation of the valve stem, incident to the operations of dispensing milk, will bring about the necessary agitation to insure an equitable distribution of the cream.

The holes in the bottom outside wall 6 may be utilized or not as desired, but, in practice, I preferably provide this outside bottom wall with a number of relatively large holes, so as to substantially skeletonize this outer wall, whereby dirt and other extraneous matter cannot permanently lodge therein. This arrangement also permits of thorough and efficient cleaning of the space between these walls. The purpose of the outside wall is fundamentally twofold. In the first place, it serves to provide a sufficient can thickness at this point for the incorporation of the dispensing mechanism and the provision of a recess in which the outer end of such mechanism with associated seals, etc., may be housed within a restricted space and thus materially protected against damage in the handling of the can and particularly when one can is rested on the top of another. In the second place, the use of the outer wall imparts a very considerable stiffening and reinforcing effect upon the inner wall, this being particularly true when both the inner and outer walls are firmly soldered and riveted to the relatively heavy reinforcing ring at the bottom of the can. The use of this outer wall thus thoroughly reinforces the inner bottom wall and at the same time takes directly any shocks or bumps to which the inner wall would otherwise be subjected.

The outer wall 6, moreover, serves as a protection to the joints between the cup 11 and the inner wall 3 for no shocks or jars can be directly received by either of these parts. It is of course common for the bottoms of milk cans to become dented, but by the provision of the outer protective wall of the character shown, these dents are received by the outer wall and do not interfere with the proper operation of the can nor are they transmitted to the inner wall.

In practice, the agitators 48 may be made of any shape and of any size and they may be made small enough if so desired to remove them through the opening in the bottom of the can.

The foregoing detailed description sets forth the invention in its preferred practical form, but the same is to be understood as fully commensurate with the appended claims.

Having thus fully described the invention, what I claim as new and desire to secure by Letters Patent is:

1. A liquid container having an aperture in the wall thereof, a measuring tube slidable through said aperture to project exteriorly of the container with an inlet port interiorly of the container and a discharge port exteriorly thereof, a valve for controlling each of said ports, and a valve stem common to both valves and connected to them to close the inlet valve when the discharge valve is opened and to open the inlet valve when the discharge valve is closed.

2. A liquid container having an aperture in the wall thereof, a measuring tube slidable through said aperture to project exteriorly of the container with an inlet port interiorly of the container and a discharge port exteriorly thereof, a valve for controlling each of said ports, and a valve stem common to both valves and connected to them to close the inlet valve when the discharge valve is opened and to open the inlet valve when the discharge valve is closed, said valve stem having a passage therethrough for the introduction of air into the container.

3. A liquid container having an aperture in the wall thereof, a measuring tube slidable through said aperture to project exteriorly of the container with an inlet port interiorly of the container and a discharge port exteriorly thereof, a valve for controlling each of said ports, a valve stem common to both valves and connected to them to close the inlet valve when the discharge valve is opened and to open the inlet valve when the discharge valve is closed, said valve stem having a passage therethrough for the introduction of air into the container, and a check valve in said passage to permit air to enter the container and preclude the flow of liquid in a counter direction.

4. A liquid container having an aperture in the wall thereof, a measuring tube slidable through said aperture to project exteriorly of the container with an inlet port interiorly of the container and a discharge port exteriorly thereof, a valve for controlling each of said ports, a valve stem common to both valves and connected to them to close the inlet valve when the discharge valve is opened and to open the inlet valve when the discharge valve is closed, said valve stem having a passage therethrough for the introduction of air into the container, a check valve in said passage to permit air to enter the container and preclude the flow of liquid in a counter direction, and means for locking the valve stem in position with the inlet valve open and the discharge valve closed.

5. A liquid container provided with an opening, a measuring tube slidable through said opening and provided therein with inlet and discharge ports spaced apart a sufficient distance to provide an intermediate measuring chamber, a valve for controlling each of said ports, a tubular valve stem common to both valves and so connecting the valves that one is closed when the other is open, and a check valve within the valve stem to permit air to enter the container through said stem and preclude the retrograde flow of liquid therethrough.

6. A liquid container provided with an opening, a pair of coaxial tubes collectively slidable through said opening and also axially slidable with respect to one another and of sufficiently different size to form between them a measuring chamber, the larger of said tubes having spaced apart inlet and discharge ports, and the smaller of said tubes constituting an air passage for the introduction of air into the container, inlet and discharge valves for said inlet and discharge ports, both of said valves being attached to said smaller tube in positions to open the inlet port when the discharge port is closed and to close the inlet port when the discharge port is open, and a check valve for the smaller tube to permit air to pass therethrough into the container and to preclude the passage of liquid in a counter direction.

7. A liquid container provided with an opening, a pair of coaxial tubes collectively slidable through said opening and also axially slidable with respect to one another and of sufficiently different size to form between them a measuring chamber, the larger of said tubes having spaced apart inlet and discharge ports, inlet and discharge valves for said inlet and discharge ports, both of said valves being attached to said smaller tube in positions to open the inlet port when the discharge port is closed and to close the inlet port when the discharge port is open.

8. A liquid container provided with an opening, a pair of coaxial tubes collectively slidable through said opening and also axially slidable with respect to one another and of sufficiently different size to form between them a measuring chamber, the larger of said tubes having spaced apart inlet and discharge ports, and a pair of plungers carried by the smaller tube in spaced apart relation to respectively open the inlet port when the discharge port is closed and to close the inlet port when the discharge port is open.

9. A liquid container provided with an opening, a pair of coaxial tubes collectively slidable through said opening and also axially slidable with respect to one another and of sufficiently different size to form between them a measuring chamber, the larger of said tubes having spaced apart inlet and discharge ports, a pair of plungers carried by the smaller tube in spaced apart relation to respectively open the inlet port when the discharge port is closed and to close the inlet port when the discharge port is open, and means for locking said tubes to one another against axial movement with one of said ports open and the other closed.

10. A liquid container provided with an external recess having an opening in its base, a pair of coaxial tubes collectively slidable through said opening and also axially slidable with respect to one another and of sufficiently different size to form between them a measuring chamber having spaced apart inlet and discharge ports, and valves for respectively opening and closing said ports, both of said valves being connected to the smaller tube in such relation that the inlet port is open when the discharge port is closed and the inlet port is closed when the discharge port is open.

11. A liquid container provided with an external recess having an opening in its base, a pair of coaxial tubes collectively slidable through said opening and also axially slidable with respect to one another and of sufficiently different size to form between them a measuring chamber having spaced apart inlet and discharge ports, and valves for respectively opening and closing said ports, both of said valves being connected to the smaller tube and operable, when the smaller tube is partially withdrawn from the larger tube, to close the inlet port and open the discharge port, and manually detachable means for locking the smaller tube against withdrawal from the larger tube, said means being received within said external recess of the container when both tubes are in retracted positions.

12. A liquid container having an aperture in the wall thereof, a measuring tube slidable through said aperture to project exteriorly of the container with an outlet port interiorly of the container and a discharge port exteriorly thereof, a valve for controlling each of said ports, a valve stem common to both valves and connected to them to close the inlet valve when the discharge valve is open and to open the inlet valve when the discharge valve is closed, and a mechanical agitator carried on and movable with the valve stem and positioned internally of the container to agitate the liquid therein when the valve stem is reciprocated to operate the valves.

13. A liquid container having an aperture in the wall thereof, a measuring tube slidable through said aperture to project exteriorly of the container with an inlet port interiorly of the container and a discharge port exteriorly thereof, a valve for controlling each of said ports, a valve stem common to both valves and connected to them to close the inlet valve when the discharge valve is opened and to open the inlet valve when the discharge valve is closed, and means within the container, movable upon operation of the valves, to mechanically agitate the liquid in the container.

14. A liquid container having an aperture in the wall thereof, a measuring tube slidable through said aperture to project exteriorly of the container with an inlet port interiorly of the container and a discharge port exteriorly thereof, a valve for controlling each of said ports, a valve stem common to both valves and connected to them to close the inlet valve when the discharge valve is opened and to open the inlet valve when the discharge valve is closed, a rod carried by the inner end of the valve stem and projecting into the confines of the container, and a plurality of superimposed agitator plates supported on said rod to agitate the liquid in the container when the valves are operated.

WILLIAM TAMMINGA.